July 14, 1970

JAMES E. WEBB
ADMINISTRATOR OF THE NATIONAL AERONAUTICS
AND SPACE ADMINISTRATION
POLARIMETER FOR TRANSIENT MEASUREMENT 3,520,617

Filed Feb. 15, 1967

OUTPUT PULSER 30 — LINE a

TRIGGER PULSES FROM 26 — LINE b

SAMPLING TIMES — LINE c y OUTPUT OF 25 — LINE d

FARADAY CELL 18 INPUT CURRENT — LINE e

INVENTOR
ALAN R. JOHNSTON
BY
ATTORNEYS

INVENTOR
ALAN R. JOHNSTON

3,520,617
POLARIMETER FOR TRANSIENT MEASUREMENT
James E. Webb, Administrator of the National Aeronautics and Space Administration, with respect to an invention of Alan R. Johnston, Los Angeles, Calif.
Filed Feb. 15, 1967, Ser. No. 617,021
Int. Cl. G01n 21/44
U.S. Cl. 356—117                         5 Claims

ABSTRACT OF THE DISCLOSURE

A polarimeter capable of measuring transient birefringence changes in electro-optic materials on a nanosecond time scale, without the requirement for manual analyzer adjustment. An optical assembly is employed by means of which light polarized in a first plane is transmitted through the test material and a quarter wave plate. The output is light polarized in a plane rotated about the first plane by an angle, proportional to the transient birefringence changes. The output of a photomultiplier, which responds to the output light intensity of the polarimeter, is sampled at specific times, measured from the leading edges of field pulses applied to the material. The samples are used to produce an average error signal, used to drive a Faraday cell, forming part of a feed-back loop, such that the transient birefringence changes could be measured in terms of Faraday-cell current.

---

The invention described herein was made in the performance of work under a NASA contract and is subject to the provisions of Section 305 of the National Aeronautics and Space Act of 1958, Public Law 85–568 (72 Stat. 435; 42 USC 2457).

BACKGROUND OF THE INVENTION

Field of the invention

This invention relates to an apparatus for measuring optical phenomena and, more particularly, to an apparatus for measuring physical phenomena which are represented by changes in angle of polarization of light.

Description of the prior art

A polarimeter is in instrument for ascertaining the state of polarized light, or for studying the effects of various forces or materials upon light of known polarization. It ordinarily consists of a polarizing member, which renders common light plane polarized in any desired azimuth, and an analyzer for identifying the character of the polarized light. Between the polarizer and analyzer, means are provided for mounting objects such as crystals, whose effects upon the polarized light is to be determined.

One prior art polarimeter is disclosed in Pat. No. 3,157,727, issued to Hardy et al. on Nov. 17, 1964. Basically, the Hardy polarimeter includes a light source, a polarizer, an analyzer, a photomultiplier with its associated amplifier, a cathode ray oscilloscope, an oscillatoi and a Faraday cell. Light from the source is directed to a sample through the polarizer, and therefrom to the photomultiplier through the Faraday cell and the analyzer. The Faraday cell is driven by the oscillator such that an accurate average value of the direction of the plane of polarization of light incident upon the analyzer is determined. The Faraday cell, driven by the oscillator, periodically varies the plane of polarization. The photomultiplier which is located adjacent the analyzer is responsive to the periodically varying light passed by the analyzer. The amplitude of the first harmonic of the photomultiplier output signal and the relative phase of the photomultiplier output and the oscillator output are displayed on the oscilloscope. By manually adjusting the analyzer, it is possible to reduce the fundamental component of the photomultiplier output signal to zero. The degree or extent to which the analyzer has to be positioned to eliminate the fundamental component of the photomultiplier output signal is directly related to the effect of the crystal on the polarized light passing therethrough.

Thus, one of the basic features of the Hardy polarimeter is the requirement for analyzer adjustment, which in Pat. No. 3,157,727, is assumed to be accomplished manually. Due to such adjustments, the Hardy polarimeter is too slow to measure transients or rapidly changing polarization shifts. Like the Hardy device, most other prior art polarimeters are based on analzer adjustments, limiting their use to constant or slowly changing polarization shifts which are slow enough for an operator to adjust the analzer. Some polarimeters employ a photomultiplier in conjunction with a servo system to adjust the analyzer. However, even such arrangements, have been found to be unsatisfactory, when attempting to measure sufficiently fast transients or rapidly changing polarization shifts.

OBJECTS AND SUMMARY OF THE INVENTION

It is therefore, a primary object of the present invention, to provide a new polarimeter.

Another object of the present invention is to provide a polarimeter for accurately measuring transients or rapidly changing polarization shifts.

A further object of the present invention is to provide a novel polarimeter, which is not based for its operation on the physical change of an analyzer to produce a null signal.

A further object of the present invention is to provide a novel polarimeter with a fixedly positioned analyzer.

Still a further object of the present invention is to provide a polarimeter with a fixedly positioned analyzer to measure transients or rapidly changing polarization shifts, in which compensating signals are generated by means other than changing the actual physical position of the analyzer.

Yet, a further object is to provide a polarimeter employing the principles of negative feed-back control, such that accurate measurement of polarization shifts is possible without accurate knowledge of light source intensity or photodetector gain.

These and other objects of the invention are achieved by providing a polarimeter, which includes a polarizer which polarizes light from a light source into an original plane of polarization, and a means for supporting a material such as a crystal, whose effect on polarized light is to be determined. A quarter-wave plate is positioned in the light path so that the plane of polarization of the light out of the plate, is rotated from the original plane by an angle which is a function of the effect of the crystal on the polarized light.

The light from the plate passes to a fixedly positioned analyzer, through a Faraday cell. The light from the analyzer is directed to a photomultiplier. The analyzer is fixedly positioned, so that the change of photomultiplier output is linearly proportional to a change in the angle at which the plane of polarization of the light from the quarter-plate is rotated away from the original plane.

The photomultiplier output is electronically sampled in phase with a periodically varied influence on the polarized light, for example a retardation induced in the crystal by a periodically changing voltage. The sampled output is passed through a low pass filter, resulting in a DC (direct current) or slowly varying signal representing the optical state existing at the instant of sampling. In addition, the invention includes a feed-back loop in which changes in retardation caused by the crystal, are balanced against the feedback inputs introduced with the Faraday cell. Thus, by measuring or monitoring the current supplied to the Faraday cell, the angle at which the plane of polarization of light from the quarter-wave plate is rotated about the original plane may be determined. Therefrom the retardation provided by the crystal as a function of the voltage periodically applied thereto may be directly ascertained.

The novel features that are considered characteristic of this invention are set forth with particularity in the appended claims. The invention itself, both as to its organization and method of operation, as well as additional objects and advantages thereof, will best be understood from the following description when read in connection with the accompanying drawings.

DESCRIPTION OF THE PREFERRED EMBODIMENTS

Figure 1:
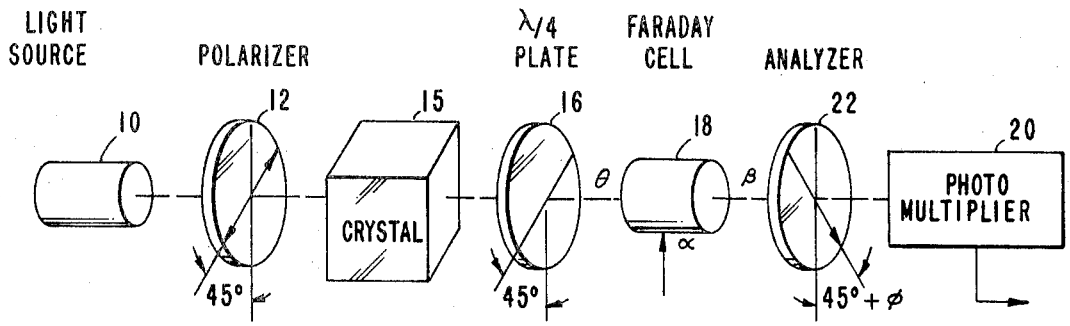
FIG. 1 is a schematic diagram of the optics of the polarimeter of the invention.

Reference is now made to FIG. 1, which is a diagram of the optics of the polarimeter of the present invention, shown including a light source 10, directing light to a polarizer 12. The function of the polarizer is to polarize the light into a reference plane, hereafter also referred to as the original plane. The polarized light passes through matter, such as a crystal 15, whose effect on the polarized light is to be measured when the crystal is subjected to transient physical phenomena, such as the application of a periodically varying voltage.

Such a voltage causes the crystal to retard the polarized light passing therethrough. The total retardation is designated $\delta$. The light from the crystal is directed to a quarter-wave ($\lambda/4$) plate 16, which reconverts the light from the crystal 15 to linearly polarized light, but in a plane which is proportional to the total retardation introduced by the crystal. $\theta = \frac{1}{2}\delta$. Thus, by measuring $\theta$ the total retardation $\delta$ could be determined therefrom.

Figure 1A:
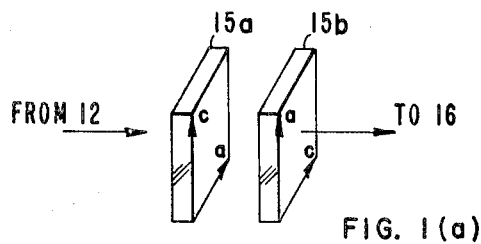
FIG. 1(a) is a schematic diagram of the relationship between two crystals, positioned to minimize their spontaneous birefringence.

The portion of the polarimeter thus far described, may be thought of as an arrangement providing linearly polarized light in a plane rotated by angle $\theta$ from a reference plane, where $\theta$ equals $\frac{1}{2}\delta$, $\delta$ being the retardation produced by the crystal 15. In practice, two crystal specimens are introduced to compensate for their large spontaneous birefringence. The relative orientation of the two crystals is diagrammed in FIG. 1(a) in which the crystals are designated by numerals 15a and 15b. It should be pointed out however, that the voltage is applied only to one of the crystals.

The polarized light from the plate 16 is directed to a Faraday cell 18 and therefrom to a photomultiplier 20 through an analyzer 22. As is appreciated by those familiar with the art, a Faraday cell is a device which rotates the plane of polarized light as a function of the electromagnetic field provided, thereby, which is in turn a function of the current supplied thereto. Hereafter, in the specification as well as in the appended claims, the term Faraday cell is assumed to refer to any device having such characteristics. In FIG. 1 let $\alpha$ designate the angle of rotation of the plane of polarized light produced by the cell. The plane of polarization at the analyzer 22 may be thought of as being rotated from the original plane by an angle $\beta$, where $\beta = \theta - \alpha$.

The analyzer 22 is initially adjusted or rotated through an arbitrary angle $\phi$ from the null position, observed without any potential field or voltage applied to the crystal 15 in order to obtain a variation of the light intensity at photomultiplier 20 which is linearly proportional to the change in angular orientation of the plane of polarization.

The light intensity transmitted through the analyzer 22 to photomultiplier 20 may be expressed as:

$$I = I_0 \sin^2(\beta - \phi)$$

where $\beta$ is the instantaneous orientation of the plane of polarization, measured from the null, and $\phi$ is the fixed offset of the analyzer and $I_0$ is the average DC light level. Differentiating the above expression, assuming $\phi$ small $$\Delta I = -2I_0 \phi \Delta \beta$$

It is thus seen that a small change in the orientation of the light incident on the analyzer $\Delta \beta$, produces a proportional change in the light level, i.e. $\Delta I$ at the photomultiplier 20.

Figure 3:
FIG. 3 is a waveform type diagram.
Figure 3:
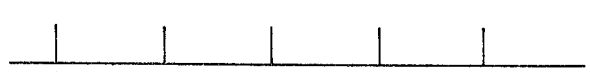
Figure 3:
Figure 3:
Figure 3:
Figure 2:
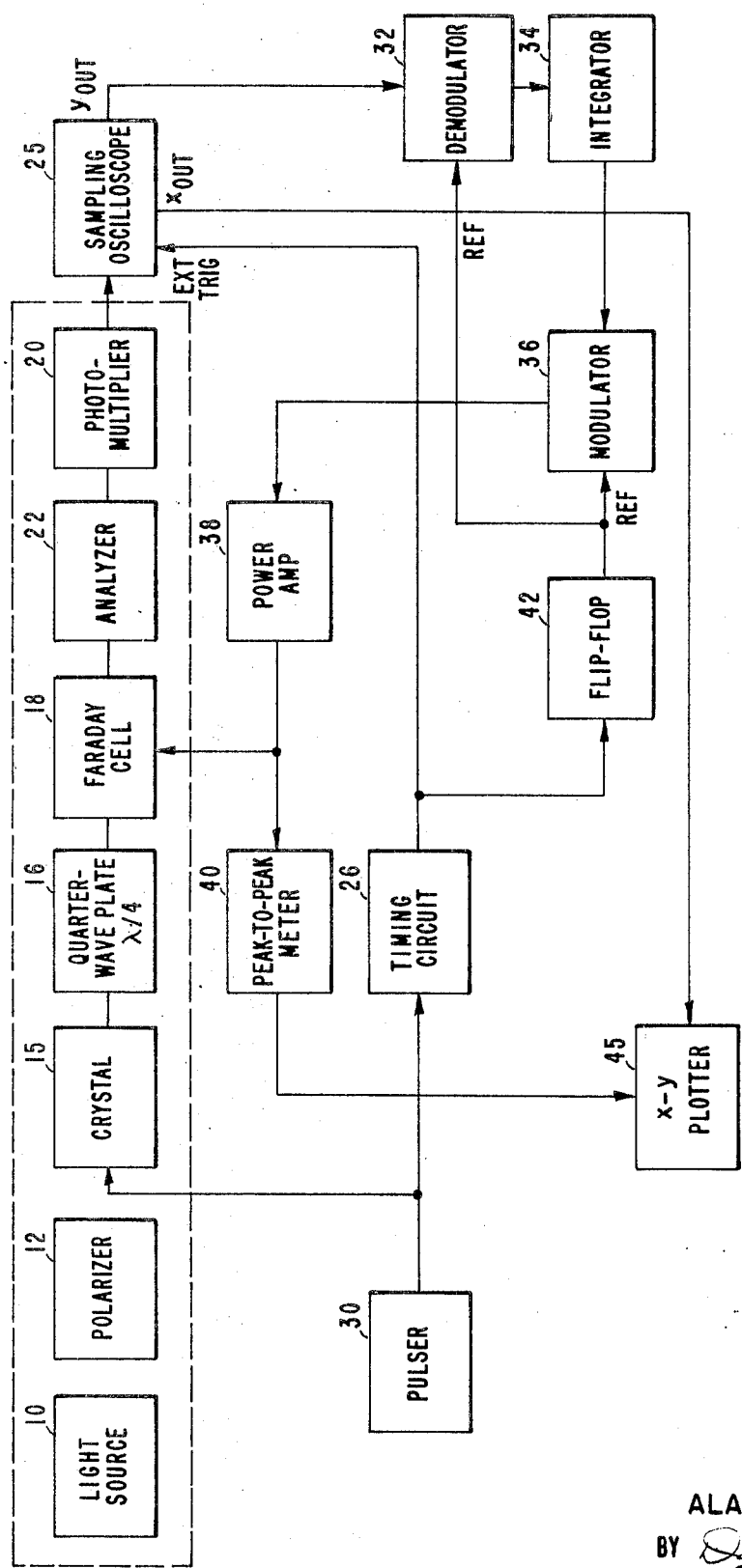
FIG. 2 is a block diagram of one embodiment of the invention.

In accordance with the teachings of the invention which may best be explained in conjunction with FIG. 2, the output of photomultiplier 20 is supplied to a sampling oscilloscope 25, whose external trigger input (EXT-TRIG) is connected to the output of a timing circuit 26. A pulsing circuit or pulser 30 is connected to both circuit 26 and crystal 15. In FIG. 2, the ports within the dotted line are those diagrammed in FIG. 1. The photomultiplier 20 and oscilloscope 25 have a fast response so that they faithfully follow fast changes in light intensity. Pulser 30 is of the type capable of delivering pulses of up to several hundred volts in amplitude at a selected pulse repetition rate. In one application, a mercury switch was employed delivering 500 volt pulses at a rate of 500 pulses per second (p.p.s.). The pulse duration was chosen to be 100 nanoseconds (ns.). The output of pulser 30 is diagrammed in line $a$ of FIG. 3, which is a waveform type diagram, useful in explaining the invention. In FIG. 3, the width of each pulse is greatly exaggerated in order to be visible. The actual voltage amplitude is chosen to produce a desired angular rotation, typically one or more degrees.

The timing circuit 26 responds to each pulse from pulser 30 to provide two identical trigger pulses which are used to trigger the oscilloscope. These are diagrammed on line $b$ of FIG. 3.

The first trigger pulse occurs as close as possible to the start of each high voltage pulse from pulser 30. The second trigger pulse provided by timing circuit 26 occurs at a fixed time after the first trigger pulse, such that it lies midway between consecutive high voltage pulses. The second trigger pulse occurs when there is no voltage applied to the crystal 15.

The output of photomultiplier 20 is sampled at time $T_s$, measured from the leading edge of each high voltage pulse or the first trigger pulse produced coincidentally therewith. The time $T_s$ is manually controllable by manually controlling the internal sweep circuit of the oscilloscope 25. The sampling times of oscilloscope 25 are diagrammed by vertical arrows in a line $c$ of FIG. 3. As seen therefrom, the oscilloscope in addition to sampling the output of the photomultiplier at a time $T_s$ after the leading edge of the high voltage pulse supplied to the crystal, is also triggered midway between the pulses when no voltage is applied to the crystal.

Basically, the oscilloscope samples the output voltage of the photomultiplier 20 near the time when the high voltage pulse is supplied to the crystal. It then holds or provides this fixed voltage at its $y$ output until the second trigger pulse is supplied thereto from the timing circuit 26. The $y$ output thereof then changes and holds a voltage proportional to the photomultiplier output at such sampling time, which occurs $T_s$ after a time midway between high voltage pulses to the crystal.

The output of the oscilloscope diagrammed in line $d$ of FIG. 3, may be seen to comprise of a noisy audio signal which is in phase with the high voltage pulses from pulser 30. The average amplitude of this noisy audio signal is a measure of the difference between the light level existing at time $T_s$ after a high voltage pulse is supplied to the crystal and at an intermediate time when the effect of the voltage pulse on the crystal is no longer present. In line $d$ of FIG. 3, the magnitude of this signal part contributed to the audio signal is greatly exaggerated. Actually, the noise greatly dominates the audio signal.

To eliminate the effect of the noise, conventional demodulation, followed by an integrator to reject noise and provide a large DC loop gain and remodulation techniques are used to obtain a current with which the Faraday cell 18 is driven to rotate the plane of polarization by an angle $\alpha$, substantially equal to the angle $\theta$ and thereby provide a measure of the retardation caused by the crystal. That is, the audio signal from the oscilloscope is first demodulated, with the output then being integrated over a sufficiently long period to reject the effect of the noise. The integrated output is then remodulated to provide an AC signal which is amplified and thereafter supplied to the Faraday cell. The magnitude of the AC current supplied to the Faraday cell is electronically automatically adjusted in response to the large total gain in such a feed-back loop, to yield at time $T_s$ after a high voltage pulse is supplied to the crystal the same light level at the photomultiplier as at a time when the crystal is undisturbed by a high voltage pulse.

Referring again to FIG. 2, therein the $y$ output of the oscilloscope 25 is shown connected to a demodulator 32, whose output is connected to an integrator 34. Integrator 34 is in turn connected to a modulator 36, whose output is connected to a power amplifier 38, whose current output is shown connected to the Faraday cell 18. The current from power amplifier 38 is also supplied to a peak-to-peak meter 40, the function of which is to monitor the current supplied by the amplifier 38 to the Faraday cell 18. Quantitive determination of the retardation induced in the crystal is obtained by calibrating the Faraday cell and measuring the peak amplitude of this drive current necessary for the angle of rotation $\alpha$ produced by the cell to equal the angle of rotation $\theta$ which in turn is equal to ½ the total retardation $\delta$ of the crystal produced by the high voltage pulses. The gains in the loop are large enough so that the Faraday cell calibration is the only parameter that need be known in order to measure the retardation $\delta$. The current supplied to the cell is diagrammed in line $e$ of FIG. 3.

As seen from FIG. 2, the polarimeter of the present invention may further include a flip-flop 42, responding to the trigger pulses from timing circuit 26, to provide a reference signal to demodulator 32 and modulator 36, with the necessary phase relationship to the trigger pulses.

The foregoing description of the invention may be summarized by considering the sampling oscilloscope 25 as an error sensor and the Faraday cell as a feed-back element forming part of a feed-back loop. The sampling oscilloscope is triggered alternately, first at the time that a high voltage pulse is applied to the crystal 15, and then midway between pulses. If a difference in light level at the photomultiplier 20 exists between these two times, the output of the oscillator 25 will change from one level to the other, alternately producing an AC signal. The amplitude of this signal represents the difference in light level at these two times, and therefore also represents the angular rotation of the plane of polarization between sampling times, caused by the retardation ($\delta$) of crystal 15.

In simplest terms, the oscilloscope output may be though of as being amplified and used to drive the Faraday cell. The amplitude of the alternating rotation produced by the Faraday cell, is subtracted from that produced by the induced retardation of the crystal and is automatically adjusted by the feed-back loop, which consists of demodulator 32, integrator 34, modulator 36 and power amplifier 38, so that the intensity differences seen by the photomultiplier at these two times is zero. This means, that the rotation produced by the Faraday cell, designated in FIG. 1 by $\alpha$, must be equal to the angle of rotation $\theta$ from the quarter-wave plate 16, which in turn is equal to ½ the total retardation $\delta$ produced by the crystal. Thus, by quantitatively measuring the current supplied to the Faraday cell 38, and therefrom by means of the calibration curves of the cell, knowing the angle of rotation $\alpha$ produced by the Faraday cell, the retardation of the crystal may be determined. As is appreciated, maximum deflection of the plane of polarization by the Faraday cell, occurs with alternating sign at each sampling time.

In practice, the sampling time $T_s$ is manually controllable by the external sweep input of the oscilloscope 25. Thus, by changing the sampling time, the retardation in crystal 15 at given instances after the leading edge of each of the high voltage pulses may be carefully and accurately determined. The time period over which the output of the demodulator 32 must be integrated to obtain an acceptable noise level may be controlled by the selection of a capacitor in integrator 34. It should also be pointed out that the oscilloscope 25 is used as an electronic circuit having an internal time delay circuit and means for externally triggering it, rather than in the conventional sense as a display device with its cathode ray tube. It should further be pointed out, that in the polarimeter of the present invention, the analyzer 22 once positioned, remains fixedly positioned during all measurements, since the desired measurements are electronically accomplished, rather than by manual adjustment of the analyzer, as is required by the polarimeters of the prior art.

The polarimeter may further include an $x-y$ plotter 45 to which is supplied the $x$ output of the oscilloscope 25 and the output of the meter 40 in order to plot the meter output, versus the instant of sampling $t_s$ after the application of a trigger pulse to the scope. Since the meter output is related to $\alpha$ which is automatically adjusted to equal $\theta$, the latter being in turn equal to ½$\delta$, the plot represents a graph of total retardation $\delta$, versus $T_s$.

In tests actually performed with a polarimeter of the present invention it has been found that the response time of the measurement is limited by the rise time of the photomultiplier 20 to a step function of light. This rise time is about 5 nanoseconds. However, with faster photodetectors, the response time of the measurement may be reduced to as low as 0.5 nanosecond.

Herebefore, the invention has been described in conjunction with a polarimeter for determining changes in retardation measured with respect to fixed axes of the crystal 15. However, the teachings disclosed herein may be extended to measure angular change in birefringent axes in a crystal with slight modifications. Briefly, if the technique for observing transient retardation derived from rotating the analyzer to obtain a null, the measurement of angular change of birefringent axes may be derived by rotating the crystal itself to achieve a null, with two Faraday cells used to generate an equivalent rotation of the crystal placed between them.

Figure 4:
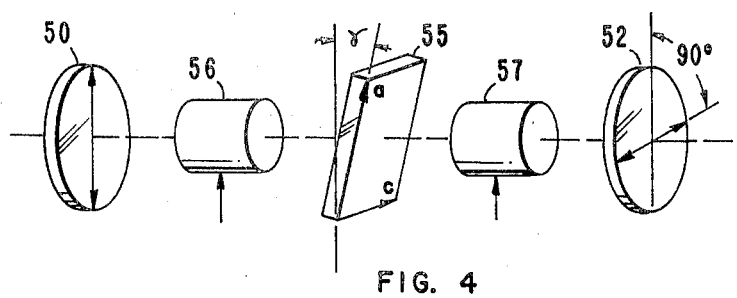
FIG. 4 is a schematic diagram of the optics of another embodiment of the invention.

Such an optical arrangement is shown in FIG. 4 to which reference is made herein. Basically, a polarizer 50 polarizes light from a source (not shown) in selected plane of reference. The light transmitted through an analyzer 52 is directed to a photomultiplier (not shown)

like photomultiplier 20 which is sampled as hereinbefore described. Between the polarizer 50 and analyzer 52 is located crystal 55 whose axes form an angle with respect to the original plane of polarization established by polarizer 50. A voltage pulse applied with appropriate electrodes to the crystal induces an additional change in the orientation of its optic axes, $\Delta\gamma$. Two Faraday cells 56 and 57 are placed on opposite sides of the crystal.

The two cells receive alternating current signals of opposite polarities, designated $i_t$ and $-i_t$. The signals are supplied from a power amplifier, such as amplifier 38 (FIG. 2) through appropriate circuitry to reverse the polarity of the signals supplied to one cell with respect to those supplied to the other. By measuring the peak-to-peak signals supplied to one of the cells, the angular change in the birefringent axes, $\Delta\gamma$ is determined.

It should be pointed out that although in the foregoing the polarimeter of the invention has been described as one for determining electro-optical properties, it need not be limited thereto. Rather, the teachings may be employed to measure any phenomenon which can be translated into light polarized in a plane, rotated from a reference plane, by an angle which is a function of the phenomenon to be measured.

There has accordingly been shown and described herein, a novel polarimeter for measuring transient birefringence changes in materials at a very fast response. All optical parts once initially aligned remain fixedly positioned since all adjustments are automatically performed by means of a closed loop feed-back arrangement. It is appreciated that those familiar with the art may make modifications and/or substitute equivalents without departing from the spirit of the invention. Therefore, all such modifications are deemed to fall within the scope of the invention as defined in the appended claims.

What is claimed:

1. A polarimeter comprising:
   a source of light polarized in a reference plane;
   an analyzer having an axis of polarization fixedly positioned with its axis rotated through a selected angle with respect to said reference plane;
   a Faraday cell placed between said analyzer and said source;
   support means adapted to support matter whose effect on polarized light is to be determined between said Faraday cell and said source;
   a quarter-wave plate positioned between said support means and said cell for converting the effect of said matter on polarized light into light polarized in a plane rotated from said reference plane by an angle which is related to the effect of the matter on the polarized light from said source;
   pulsing means for subjecting said matter to transient physical phenomenon; and
   output means responsive to the light transmitted through said analyzer for controlling said Faraday cell to rotate the light passing therethrough whereby the light transmitted through said analyzer is substantially constant, said output means including light sampling means responsive to light transmitted through said analyzer at selected sampling times during said transient physical phenomena and therebetween to provide an error signal, means for converting said error signal into an alternating current signal and for supplying said alternating current signal to said Faraday cell, and means for determining the amplitude of said alternating current signal.

2. The polarimeter as recited in claim 1 wherein said matter is a crystal having electro-optical characteristics and said pulsing means provide a sequence of voltage pulses at a selected rate to which said crystal is subjected, each pulse having a duration of less than one microsecond, said polarimeter further including means responsive to each voltage pulse for generating a first trigger pulse in response thereto and a second trigger pulse between successive voltage pulses; and
   means for actuating said light sampling means with said first and second trigger pulses to sample the light at selected intervals after said first and second trigger pulses are supplied to said light sampling means.

3. A polarimeter for measuring the retardation effect on polarized light induced by a crystal of matter when subjected to transient periodically changing voltage comprising:
   a source of light polarized in a first plane of reference;
   a Faraday cell in the path of said polarized light;
   means adapted to support a crystal of matter between said source and said cell, said crystal being of the type retarding the polarized light as a function of voltage pulses applied thereto;
   a quarter-wave plate positioned between said crystal and said Faraday cell for converting the light retarded by said crystal to light polarized in a plane rotated through an angle $\theta$ from said first plane, $\theta$ being equal to one-half the retardation of said light by said crystal;
   photomultiplier means for providing an output proportional to light incident thereto;
   an analyzer having an axis of polarization fixedly positioned between said cell and said photomultiplier means, whereby the change of output of said photomultiplier means is substantially linearly proportional to the change in $\theta$;
   pulsing means for successively applying voltage pulses to said crystal; and
   output means defining a feed-back loop responsive to the outputs of said photomultiplier means at selected intervals after the leading edge of each voltage pulse and midpoint between successive voltage pulses for providing an averaged error signal and for controlling said cell with signals related to said averaged error signal, whereby said cell rotates the plane of polarization of the light passing thereto by an angle substantially equal to $\theta$, so that the output of said photomultiplier means is substantially constant.

4. The polarimeter as recited in claim 3 wherein said output means includes a timing circuit responsive to each voltage pulse for generating a first trigger pulse substantially coincidental therewith and a second trigger pulse substantially midpoint between successive voltage pulses, and means utilizing said first and second trigger pulses to sample the output of said photomultiplier means at adjustably selected intervals after said first and second trigger pulses, whereby successive samples of the output of said photomultiplier means represent outputs when said crystal is subjected to a voltage pulse and between voltage pulses.

5. The polarimeter as recited in claim 4 wherein said output means include a demodulator responsive to the sampled outputs of said photomultiplier means;
   means for integrating the output of said demodulator to provide an averaged error signal;
   modulating means for providing an alternating current signal of a frequency related to the rate of said voltage pulses and of an amplitude which is a function of the amplitude of said averaged error signal;
   means for energizing said cell with said alternating current signal; and
   means for monitoring the amplitude of said alternating current signal.

References Cited

UNITED STATES PATENTS

| | | | |
|---|---|---|---|
| 3,312,141 | 4/1967 | Cary | 356—117 |
| 3,397,607 | 8/1968 | Goodwin | 356—117 |

(Other references on following page)

OTHER REFERENCES

B. Carroll and I. Blei: "Measurement of Optical Activity: New Approaches," Science, vol. 142, Oct. 11, 1963, pp. 200–208.

A. R. Johnston and J. M. Weingart: "Determination of the Low-Frequency Linear Electro-Optic Effect in Tetragonal $BaTiO_3$," Journal of Optical Society of America, July 1965, vol. 55, # 7, pp. 828–834.

RONALD L. WIBERT, Primary Examiner

J. ROTHENBERG, Assistant Examiner